SHAPING THE POWER DENSITY SPECTRA OF PULSE TRAINS

Filed Dec. 19, 1960 2 Sheets-Sheet 1

INVENTOR
T. V. CRATER
BY R. B. Anderson
ATTORNEY

May 12, 1964 T. V. CRATER 3,133,280

SHAPING THE POWER DENSITY SPECTRA OF PULSE TRAINS

Filed Dec. 19, 1960

2 Sheets-Sheet 2

INVENTOR
T.V. CRATER
BY
ATTORNEY 3,133,280

SHAPING THE POWER DENSITY SPECTRA OF PULSE TRAINS

Theodore V. Crater, Whippany, N.J., assignor to Bell Telephone Laboratories, Incorporated, New York, N.Y., a corporation of New York Filed Dec. 19, 1960, Ser. No. 76,942
4 Claims. (Cl. 340—352)

This invention relates to communications systems that transmit information in the form of pulse code.

Whatever the number base of a pulse code or the character of the pulse train representing the code, it is often advantageous to shape the power density spectrum of the train so that some desired end may be achieved. If, for example, it is primarily desired to avoid the zero drift of a unipolar pulse train in systems that include reactive coupling devices, the spectrum can be shaped to have a null at zero frequency. The art is resplendent with schemes for achieving this end. For example, Patent No. 2,700,696, which issued to R. H. Barker on January 25, 1955, discloses several methods for producing a spectral null at zero frequency. In many systems, however, the provision of such a null is of subsidiary importance. Of primary interest in such systems is bandwidth conservation—the ability to employ the available frequency band for as many purposes as possible—and, at the same time, to keep to a minimum the cost of equipment needed to effect this conservation. It is the primary object of the present invention to achieve these ends.

More specifically, it is an object of the invention to convert a binary pulse train to one which is pseudo-ternary and which permits more efficient use of the pulse transmission medium.

Still more specifically, it is an object of the invention in its most basic aspect, to produce a broad null in the power density spectrum of a pulse train at half its basic repetition frequency and to transfer into the spectral range below that frequency as much as possible of the higher frequency energy of the train.

Spectral shaping ordinarily is accomplished by converting a code, usually unipolar, to pseudo-ternary form. Throughout this specification and in the claims, the terms "spectral" and "spectrum" should be understood to refer to the power density spectrum of the wave in question. Moreover, it will be helpful at this point if the meaning of the commonly-used expression "pseudo-ternary" is clearly set forth. A ternary code has a number base of three and is one in which three possible code values—plus, minus, and zero—randomly occur. A pseudo-ternary code, on the other hand, may have a binary base, but is distinguished primarily in its conformity to some fixed constraint. Though it too has three possible code values (plus, minus, and zero), these do not randomly occur, as they do in an authentic ternary code. Thus, the art discloses pseudo-ternary codes in which codes consist, for example, of alternately positive and negative pulses, or consecutive groups of equal-numbered time slots in each of which negative pulses are exactly balanced by positive pulses, or consecutive groups of equal-numbered time slots that are occupied alternately by positive and negative pulses. All of these codes are pseudo-ternary in the sense that their digits are not free to take the form of positive or negative pulses in accordance with the original message value only, but must adhere to some fixed law.

In accordance with the invention, the pseudo-ternary form of a pulse train—that is to say, the polarities of its component pulses—is made to depend upon the parity (oddness or evenness) of the number of time slots occupied by spaces that intervene between any two successive time slots occupied by pulses. A "space" is defined negatively as the absence of a pulse, and is identified whenever a time slot is unoccupied by a pulse. Time slots, of course, are the regularly recurring basic time elements of a pulse code, and they encompass the digits of the code. Within their respective time slots, these digits consist electrically of pulses and spaces which represent binary "1" and binary "0," respectively.

In accordance with the invention in its simplest form, a broad null in the power density spectrum of a pulse train is produced at half its basic repetition frequency by rendering the polarities of any two successive pulses opposite to one another whenever an odd number of time slots occupied by spaces intervenes between them. When this number is even, the pulses are constrained to be of the same polarity. Additional use may thus be made of the pulse transmission medium. For example, a sinusoidal wave of the null frequency may be added for timing or other purposes. Ramifications of this basic parity-of-spaces scheme will be discussed later in connection with an illustrative embodiment.

The invention also permits the transmission of two pulse trains, adjacent to each other in the frequency band, on neighboring lines with greatly reduced interference. The guard band between them can be reduced substantially, and because—to take the simplest form of the invention as an illustration—a broad null is provided at half the repetition frequency, cheap filters may be employed to extract any wave occupying this now available portion of the frequency band. In certain instances, therefore, these advantages and features more than overcome the fact that a null is not provided at zero frequency.

The term "parity" is used in a mathematical sense throughout the specification and the claims. It is that characteristic of an integral number which makes the number odd or even. Thus, if two integers are both odd or both even, they are said to have the same parity. If, on the other hand, one is odd and the other even, they are said to have different parity. It should be noted, furthermore, that the number zero is here considered to be an even number.

A better understanding of the invention will be had after considering the following detailed description of several illustrative embodiments. In the drawings.

Figure 1:
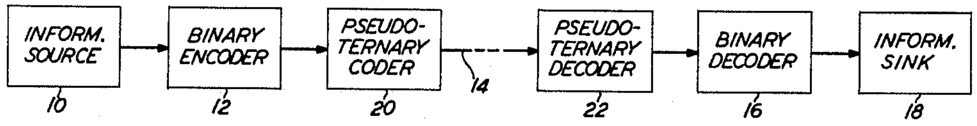
FIG. 1 is a block diagram of a pulse-type communications system employing the present invention.

A pulse communication system is shown in FIG. 1. Analogue messages, derived at an information source 10, are supplied to a binary encoder 12, wherein they are quantized and converted to a train of unipolar pulses. In this specification it will be assumed that these analogue messages are initially transformed to a binary code. It is not necessary, however, that a binary code be employed. Accordingly, it should be understood that this assumption has been made to facilitate the description, and not to limit the scope, of the invention.

Ordinarily, after transformation to a binary code, the intelligence is conveyed over a transmission medium 14 to a binary decoder 16, and thence to an information sink 18. But in order to shape the power density spectrum of the pulse train emanating from the binary encoder 12, a pseudo-ternary coder 20, whose structure will be dealt with in detail in the discussion that follows, is inserted before the transmission medium 14.

The pulse train transmitted over the medium 14 is therefore pseudo-ternary in form, and it is necessary at the receiver, which includes the binary decoder 16 and the information sink 18, to precede these receiver elements with a pseudo-ternary decoder 22. The complexity of the pseudo-ternary decoder 22 depends upon the pseudo-ternary code employed. As will later be seen, the pseudo-ternary code contemplated by the invention is such that its transformation to the basic code of the system requires only that it be rectified by the decoder 22.

Figure 2:
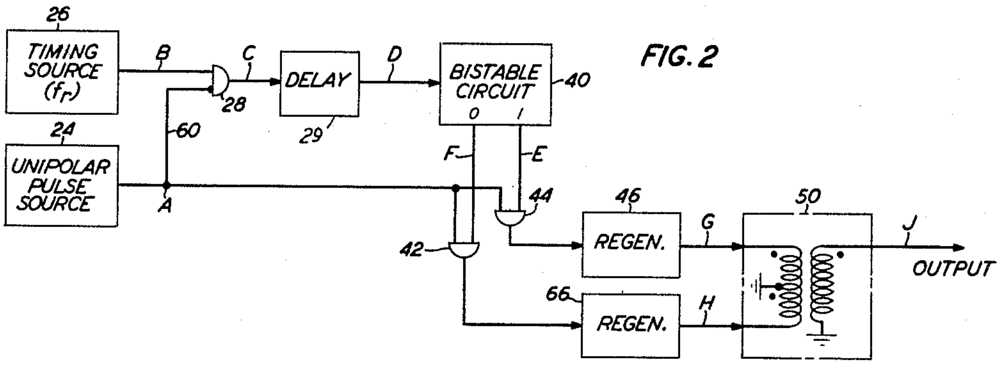
FIG. 2 is a block diagram of an illustrative embodiment of the invention in its basic form.

FIG. 1 is intended to show how the present invention may be employed in a pulse communication system. FIG. 2 is an illustrative embodiment of the invention which may serve as the pseudo-ternary coder 20 of FIG. 1. In FIG. 2, a unipolar pulse source 24 is the equivalent of the binary encoder 12 of FIG. 1. The timing source 26 may comprise a master oscillator of the type ordinarily found in a pulse code transmitter and, though it is not shown in FIG. 1, would be necessary to time the processes which take place in the transmitter comprising the information source 10, the binary encoder 12, and the pseudo-ternary coder 20. FIG. 2 is best understood when it is described in connection with the plot of wave forms in FIG. 3.

Figure 3:
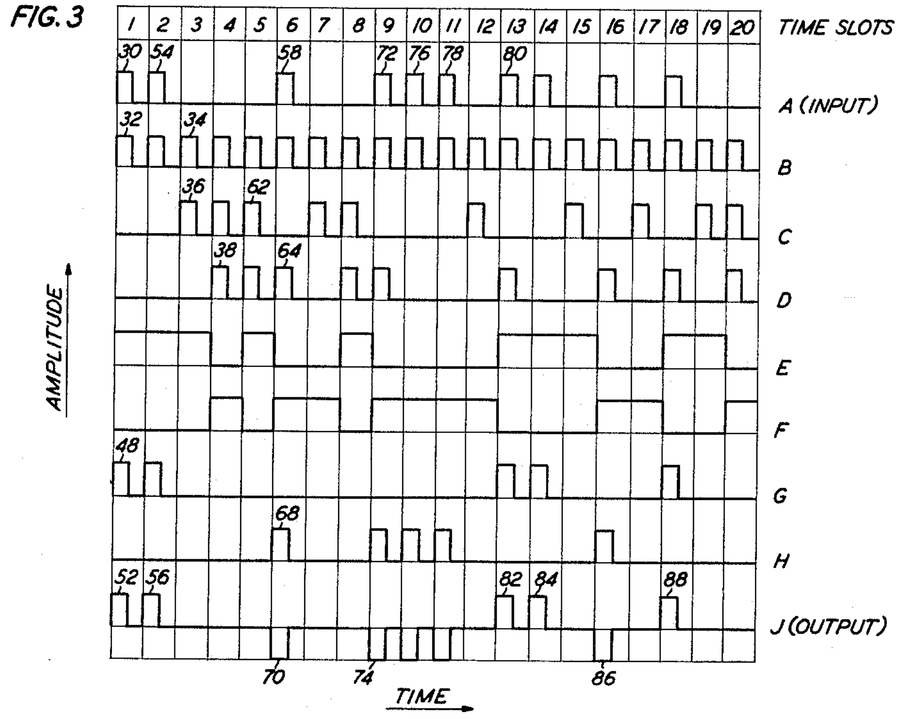
FIG. 3 is a plot of wave forms present at various indicated points of FIG. 2.

FIG. 3 shows a succession of time slots and the pulses and spaces occurring therein at various indicated points in FIG. 2. The wave form A, occurring at point A in FIG. 2, is a binary pulse train. The wave form B, which occurs at point B, is a timing wave whose pulses are permitted to pass through the inhibit gate 28 only upon the nonconcurrence of pulses from the pulse source 24. Thus, for example, in the first time slot of the array shown in FIG. 3, the pulse 30 inhibits the passage of the timing pulse 32 through the inhibit gate 28 so that no pulse appears in the first time slot at the point C. But since no pulse in the binary pulse train at point A is present during time slot 3, the inhibit gate 28 is not inhibited at that time and the pulse 34 is passed on to the point C as the pulse 36.

After appearing at the point C, all pulses are delayed in a delay circuit 29 by an interval equal to one time slot, so that the pulse 36 does not appear at the point D until the commencement of time slot 4. It appears there as the pulse 38 and its effect is to trigger the bistable circuit 40 which, as FIG. 3 shows, was in a state of equilibrium prior to the commencement of time slot 4 such that the points E and F were in the binary "1" and "0" states, respectively. The state of equilibrium of the bistable circuit 40 is compared, in AND gates 42 and 44, with the time occurrences of pulses emanating from the pulse source 24. Each of these gates is shown in conventional form as a closed arc, with the inputs of the gate extending to the chord of the arc and the output emanating from the arc's midpoint.

When the pulse 30 appears at point A, the point E is in the binary "1" state and, consequently, the AND gate 44 is enabled. Enablement of the AND gate 44 in turn causes the regenerator 46 to produce a refurbished pulse 48 at the point G. Pulse 48 is supplied to the polarity conversion circuit 50, wherein no polarity reversal takes place. Thus, pulse 30 finally appears at the point J, the output of the pseudo-ternary coder of FIG. 2, as a positive pulse 52. In similar fashion, the pulse 54 appears at point J as a positive pulse 56. It should be noted that the number of time slots occupied by spaces intervening between pulse 30 and the pulse 54 is zero, a number whose parity, as was mentioned before, is even. Therefore, in accordance with the invention, the polarities of these pulses are constrained to be the same in the pseudo-ternary code appearing at point J.

Pulse 58 of the unipolar train that appears at point A is separated from the last preceding pulse 54 by three time slots occupied by spaces. The number three is an odd number and therefore, in accordance with the invention, the circuit of FIG. 2 reverses the polarity of this pulse. Since the pulse 58 inhibits the inhibit input 60 of the inhibit gate 28, a pulse does not appear at point C during this time slot (time slot 6). However, since the pulse 62 arrives at the point D at the commencement of the time slot 6 as the pulse 64, the bistable circuit 40 is triggered into its other state of equilibrium and the points E and F are caused to be in the binary "0" and "1" states, respectively. And since the point F is in the binary "1" state, the pulse 58 and the binary state of the point F will enable the AND gate 42, triggering the regenerator 66, which in turn causes a pulse 68 to appear at the point H. The polarity of this pulse is reversed in the polarity conversion circuit 50 so that it appears at the point J as a negative pulse 70.

The foregoing examples, namely, the processes generated by the pulses 30, 54 and 58, in the circuit of FIG. 2, are sufficient to illustrate the manner in which the pseudo-ternary code of the present invention is generated. Thus, it can be seen that whenever the number of time slots occupied by spaces intervening between any two successive pulses of the pulse train appearing at point A is even, the polarities of these pulses will be the same. When, however, the number of intervening time slots occupied by spaces is odd, the polarities of the two successive pulses will be opposite to one another. Thus, to continue in our analysis of the pulse train appearing at point A, it can be seen that since there are two time slots occupied by spaces intervening between the pulse 58 and the pulse 72, the polarities of the progeny of these pulses will be the same. The polarity of the pulse 74 is therefore the same as that of the pulse 70. Since no time slots occupied by spaces intervene between the pulses 72 and 76 and between the pulses 76 and 78, the polarities of the respective progeny of these pulses also will be the same. A change of polarity occurs in time slot 13, since the pulse 80 is separated from the last preceding pulse 78 by one time slot occupied by a space, which is an odd number. Consequently, the pulse 82 appears at point J as a positive pulse. Pulse 84 is also positive since an even number of time slots occupied by spaces intervenes between it and the pulse 82. But the polarities of the pulses 84 and 86 are opposite to one another, as are those of the pulses 86 and 88, since in each case the number of intervening time slots occupied by spaces is odd.

Figure 4:
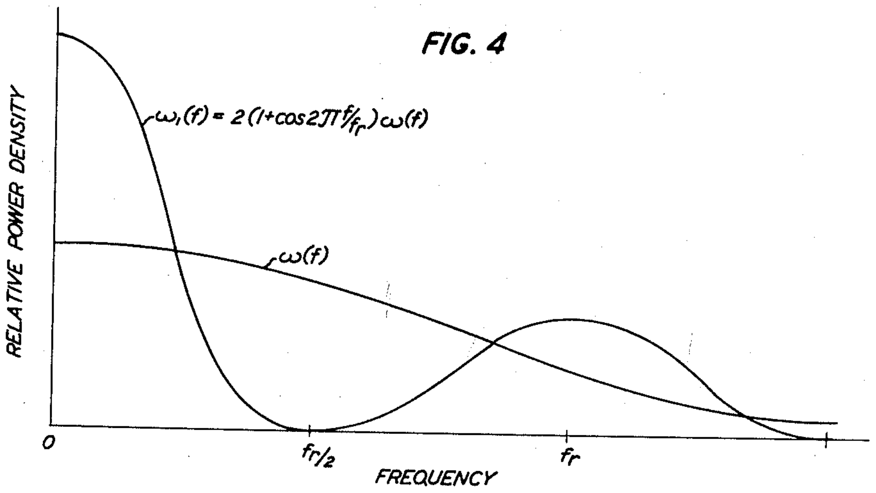
FIG. 4 is a plot of power density spectra.

The power density spectra of the pulse trains appearing at the points A and J of FIG. 2 are illustrated in FIG. 4. The curve $\omega(f)$ represents the spectral density (the relative distribution of power with respect to frequency) of the unipolar pulse train appearing at point A. The curve $\omega_1(f)$ represents the spectral density of the pseudo-ternary pulse train that appears at point J. A broad spectral null occurs in the curve $\omega_1(f)$ at half the basic repetition frequency $f_r$. As was mentioned previously, this broad null may be used to advantage—e.g., to accommodate a timing wave of the null frequency, in which case it should be noted that any submultiple of the repetition frequency may later be converted to the basic repetition frequency itself by conventional frequency multiplying techniques.

The circuit of FIG. 2 is intended to illustrate the means by which the basic pseudo-ternary code of this invention may be produced. This code takes the form of a bipolar pulse train having the continuous spectrum $$\omega_1(f)=2(1+\cos 2\pi f/f_r)\omega(f)$$

where $\omega(f)$ represents the continuous spectrum of the unipolar pulse train emanating from the source 24 of FIG. 2 and $f_r$ is the basic repetition frequency of the pulse train. As was mentioned before, the continuous spectra $\omega(f)$ and $\omega_1(f)$ are illustrated in FIG. 4.

Figure 5:
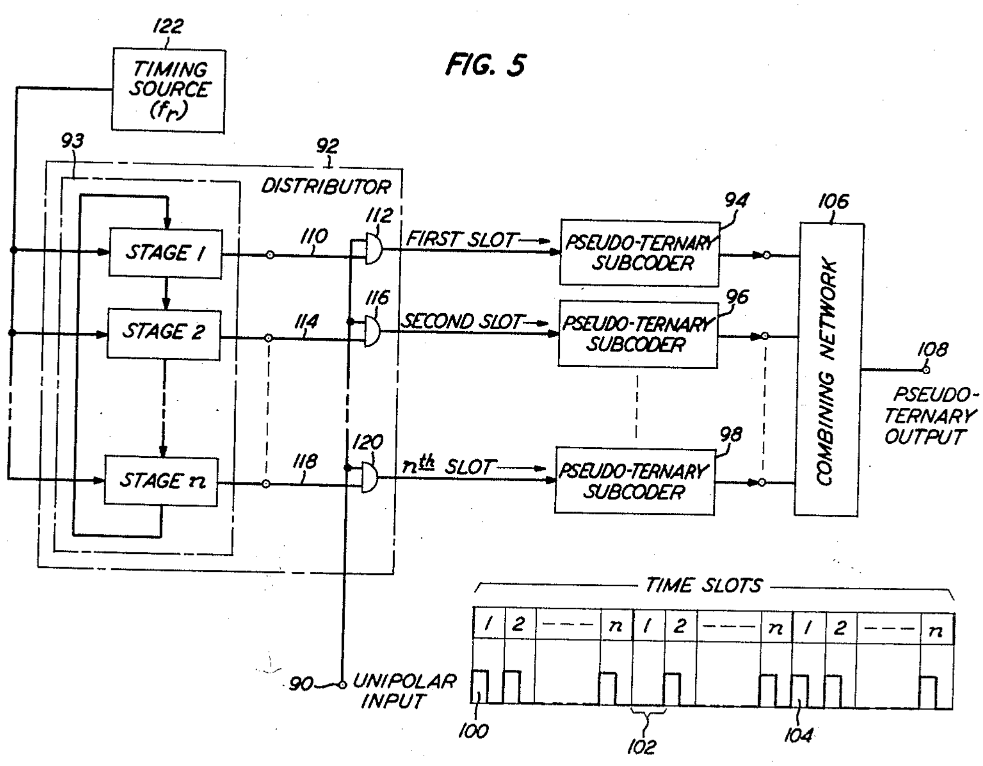
FIG. 5 is a block diagram of another illustrative embodiment of the invention.

FIG. 5 illustrates some ramifications of the basic principles of the invention. Thus, suppose we take an array of time slots and break it up, as shown in FIG. 5, into successive groups of $n$ time slots each. In the basic structure of FIG. 2, $n$ is equal to unity. In FIG. 5, $n$ may equal 2, 3, 4, etc. If we apply the basic polarity constraint, already discussed for $n=1$, separately in $n$ pseudo-ternary subcoders to the contents (pulses and spaces) of the first time slot of each group, the second time slot of each group, and so on to the $n$th time slot of each group (assuming for the moment that $n$ is greater than two), and then recombine the pulses of the pseudo-ternary code thus formed in their original time sequence, we will have produced a power density spectrum having nulls at more than one submultiple of the basic repetition frequency $f_r$. In general, nulls will be produced at the following frequencies:

$$\frac{(2k-1)f_r}{2n}$$

where $k$ is a series equal to 1, 2, 3, etc. Thus, for example, if we assume that $n=2$, nulls will be produced at $f_{r/4}$, $3f_{r/4}$, $5f_{r/4}$, etc. As a practical matter, however, only the nulls occurring at submultiples of the repetition frequency are of importance.

In FIG. 5, a unipolar pulse train is fed into an input terminal 90 and thence into a pulse distributor 92, which sequentially routes the contents of successive time slots of the incoming pulse train into $n$ separate pseudo-ternary subcoders. The pulse distributor 92 may comprise a conventional ring circuit 93 having $n$ stages (not all shown).

Associated with each of these stages is an AND gate, one input of which is connected to its associated stage and the other to the input terminal 90. Thus, stage 1 energizes the input 110 of AND gate 112, stage 2 the input 114 of AND gate 116, and stage $n$ the input 118 of AND gate 120. Each of these AND gates will be enabled, of course, only when all of its inputs are stimulated simultaneously; i.e., only when its associated ring circuit stage is energized and a pulse is present at the input terminal 90.

Pulses from the timing source 122, supplied simultaneously to all stages of the ring circuit 93, sequentially trigger these stages, energizing them so that they, in turn, can energize their associated AND gates. The first pulse from source 122 triggers stage 1, the second pulse stage 2, and so on until the $n$th pulse triggers stage $n$. The process then repeats. The sequence is thus stage 1 through stage $n$, stage $n$ to stage 1, and so on.

Each of the pseudo-ternary subcoders of FIG. 5 does to the individual pulse pattern supplied to it what the circuit of FIG. 2 does to its incoming pulse train. That is to say, the basic polarity constraint imposed by FIG. 2 is imposed in each of the pseudo-ternary subcoders 94, 96, . . . 98 of FIG. 5. The subcoder 94 imposes this constraint to the contents of the first time slot of each group of $n$ time slots, as does the subcoder 96 to the contents of the second time slot of each group, and so on. Subcoder 94, for example, receives from AND gate 112 of the pulse distributor 92 a pulse train comprising the pulse 100, a series of spaces (including the space 102) extending to the pulse 104, then the pulse 104, and so on. If the number of time slots occupied by spaces intervening between the pulses 100 and 104 is odd, the polarity of the pulse 104 will be reversed and appear as a negative pulse at the output of subcoder 94. If this number is even, a reversal of polarity will not occur. The subcoders 96 and 98 similarly operate on the contents of their respective time slots.

The pseudo-ternary trains produced in the subcoders of FIG. 5 are then combined in the combining network 106, which may be a summing network of conventional design; and the pulses received at the input terminal 90 appear again in their original sequence, though now in pseudo-ternary form, at the output terminal 108. The circuit of FIG. 5 would occupy the position of the pseudo-ternary coder 20 of FIG. 1.

The circuits discussed above are illustrative of the invention. Other arrangements, within the spirit and scope of the invention, will suggest themselves to those skilled in the art.

What is claimed is:

1. Apparatus for transforming the power density spectrum of a unipolar train of time slots occupied by respective pulses and spaces into one with a broad null at half the basic repetition frequency of said time slots and with the bulk of the power below said frequency which comprises means to transmit consecutive pulses in said train as pulses of opposite polarity when separated by $x$ time slots occupied by spaces, where $x$ is any odd integer, means to transmit consecutive pulses in said train as pulses of like polarity when separated by $y$ time slots occupied by spaces, where $y$ is any even integer including zero, and means to transmit all spaces in said train as spaces.

2. Apparatus for transforming the power density spectrum of a unipolar train of time slots occupied by respective pulses and spaces into one with a broad null at an integral submultiple of the basic repetition frequency of said time slots and with the bulk of the power below said integral submultiple of said frequency which comprises a plurality of conversion channels, means to route the contents of successive time slots of said train into different ones of said channels in sequence, means to transmit consecutive pulses in each of said channels as pulses of opposite polarity when separated by $x$ time slots occupied by spaces, where $x$ is any odd integer, means to transmit consecutive pulses in each of said channels as pulses of like polarity when separated by $y$ time slots occupied by spaces, where $y$ is any even integer including zero, means to transmit all spaces in each of said channels as spaces, and means to combine the contents of all time slots from all of said channels in their original order of occurrence in said unipolar train.

3. Apparatus for transforming the power density spectrum of a unipolar train of time slots occupied by respective pulses and spaces into one with a broad null at half the basic repetition frequency of said time slots and with the bulk of the power below said frequency which comprises a pair of AND gates each having a pair of inputs and a single output, means to generate a pulse during each of said time slots occupied by a space, a binary counter having a single input and a pair of outputs of respectively opposite polarity, means to delay the generated pulses one time slot and supply the delayed pulses to the input of said binary counter, means to supply said unipolar train and one of the outputs of said binary counter to the respective inputs of one of said AND gates, means to supply said unipolar train and the other of the outputs of said binary counter to the respective inputs of the other of said AND gates, and means to combine the outputs of said AND gates in phase opposition to one another.

4. Apparatus for transforming the power density spectrum of a unipolar train of time slots occupied by respective pulses and spaces into one with a broad null at an integral submultiple of the basic repetition frequency of said time slots and with the bulk of the power below said integral submultiple of said frequency which comprises a plurality of conversion channels, means to route the contents of successive time slots of said train into different ones of said channels in sequence, a pair of AND gates in each of said channels each having a pair of inputs and a single output, means in each of said channels to generate a pulse during each of the routed time slots occupied by a space, a binary counter in each of said channels having a single input and a pair of outputs of respectively opposite polarity, means in each of said channels to delay the generated pulses until the next routed time slot and supply the delayed pulses to the input of said binary counter, means in each of said channels to supply the contents of the routed time slots and one of the outputs of said binary counter to the respective inputs of one of said AND gates, means in each of said channels to supply the contents of the routed time slots and the other of the outputs of said binary counter to the respective inputs of the other of said AND gates, means in each of said channels to combine the outputs of said AND gates in phase opposition to one another, and means to combine the contents of all time slots from all of said channels in their original order of occurrence in said unipolar train.

References Cited in the file of this patent

UNITED STATES PATENTS

| | | |
|---|---|---|
| 2,626,314 | Coley | Jan. 20, 1953 |
| 2,912,684 | Steele | Nov. 10, 1959 |
| 2,926,346 | Smith et al. | Feb. 23, 1960 |

OTHER REFERENCES

Bell System Technical Journal, vol. 38, No. 4, July 1959, "Recurrent Codes," by Hagelbarger, pp. 969–984.